US011602808B2

(12) United States Patent
Merritt et al.

(10) Patent No.: US 11,602,808 B2
(45) Date of Patent: Mar. 14, 2023

(54) SOLDER PREFORM WITH INTERNAL FLUX CORE INCLUDING THERMOCHROMIC INDICATOR

(71) Applicant: INDIUM CORPORATION, Utica, NY (US)

(72) Inventors: Craig K. Merritt, Remsen, NY (US); Anthony D. Lanza, Jr., Rome, NY (US); James B. Hevel, Orland Park, IL (US)

(73) Assignee: INDIUM CORPORATION, Utica, NY (US)

( * ) Notice: Subject to any disclaimer, the term of this patent is extended or adjusted under 35 U.S.C. 154(b) by 294 days.

(21) Appl. No.: 16/862,299

(22) Filed: Apr. 29, 2020

(65) Prior Publication Data

US 2020/0346307 A1    Nov. 5, 2020

Related U.S. Application Data

(60) Provisional application No. 62/840,931, filed on Apr. 30, 2019.

(51) Int. Cl.
*B23K 35/02* (2006.01)
*B23K 35/22* (2006.01)
*B23K 35/26* (2006.01)
*B23K 101/32* (2006.01)
*B23K 101/06* (2006.01)

(52) U.S. Cl.
CPC .......... *B23K 35/0227* (2013.01); *B23K 35/22* (2013.01); *B23K 35/262* (2013.01); *B23K 2101/06* (2018.08); *B23K 2101/32* (2018.08)

(58) Field of Classification Search
None
See application file for complete search history.

(56) References Cited

U.S. PATENT DOCUMENTS

| 2,503,564 | A | * | 4/1950 | Reeve | B23K 35/262 |
| | | | | | 420/580 |
| 2,945,464 | A | * | 7/1960 | Tomoda | B23K 35/0222 |
| | | | | | 428/595 |
| 3,087,238 | A | * | 4/1963 | Nottingham | B23K 35/3613 |
| | | | | | 228/103 |

(Continued)

FOREIGN PATENT DOCUMENTS

| EP | 2038085 | 3/2009 |
| WO | WO 2007/140236 | 12/2007 |
| WO | WO 2019/070779 | 4/2019 |

OTHER PUBLICATIONS

International Search Report and Written Opinion dated Aug. 14, 2020 for International Application No. PCT/US2020/030536, filed Apr. 29, 2020.

*Primary Examiner* — Devang R Patel
(74) *Attorney, Agent, or Firm* — Sheppard, Mullin, Richter & Hampton LLP

(57) ABSTRACT

Some implementations of the disclosure are directed to a solder preform, comprising: a solder alloy body, the solder alloy body comprising at least one opening; and a flux core embedded in the solder alloy body, the flux core comprising a thermochromic indicator, wherein during reflow soldering, the flux core comprising the thermochromic indicator is configured to flow out of the at least one opening of the solder alloy.

14 Claims, 8 Drawing Sheets

(56) References Cited

U.S. PATENT DOCUMENTS

| | | | | |
|---|---|---|---|---|
| 3,388,850 | A * | 6/1968 | Laubmeyer | B23K 35/0227 228/56.3 |
| 4,137,369 | A * | 1/1979 | Chaikin | B23K 35/3612 228/264 |
| 4,344,909 | A * | 8/1982 | De Blauwe | B29C 61/06 53/442 |
| 4,505,421 | A | 3/1985 | Gen et al. | |
| 4,563,224 | A * | 1/1986 | Gen | H01R 4/723 148/23 |
| 4,667,869 | A * | 5/1987 | Gen | G01K 11/16 228/103 |
| 4,809,901 | A * | 3/1989 | Gen | H01R 4/723 228/56.3 |
| 5,781,846 | A * | 7/1998 | Jossick | B23K 35/0227 428/560 |
| 5,789,068 | A * | 8/1998 | King | B23K 35/0222 428/407 |
| 6,193,131 | B1 * | 2/2001 | Oud | B23K 35/0233 228/171 |
| 6,264,062 | B1 | 7/2001 | Lack et al. | |
| 7,858,204 | B2 * | 12/2010 | Campbell | B23K 35/406 428/626 |
| 9,731,383 | B2 * | 8/2017 | Campbell | B23K 35/0227 |
| 10,086,477 | B2 * | 10/2018 | Howard | B23K 35/0227 |
| 2009/0101238 | A1 * | 4/2009 | Jossick | B23K 35/3602 148/23 |
| 2015/0044465 | A1 * | 2/2015 | Gan | B23K 35/3616 428/378 |

\* cited by examiner

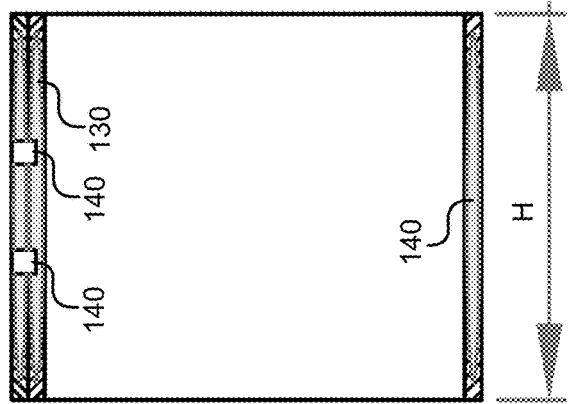
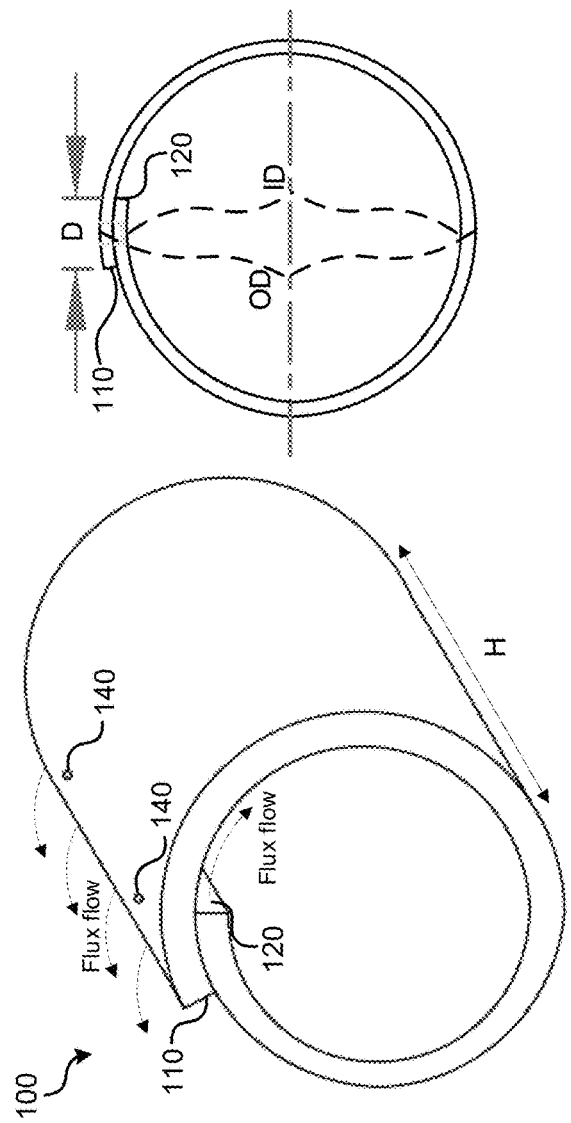
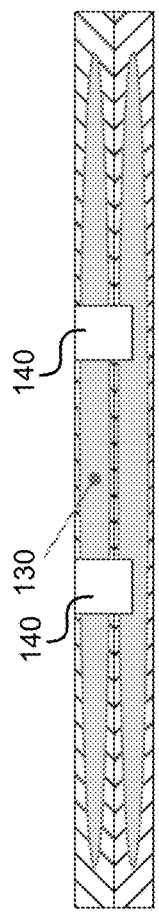
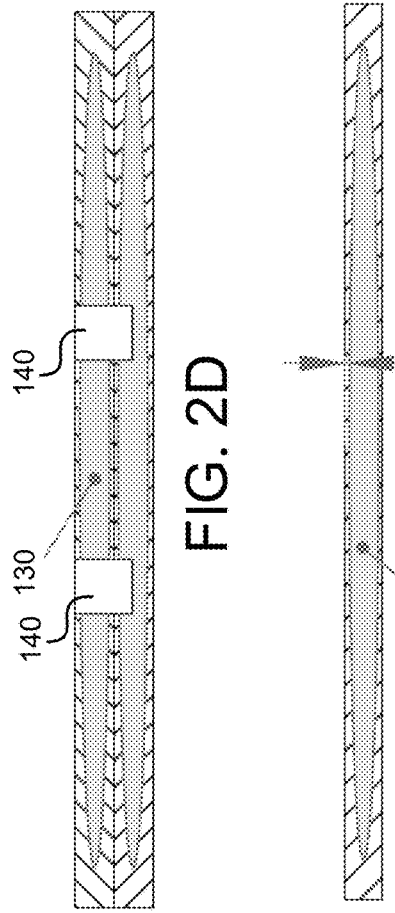
FIG. 2A
FIG. 2B
FIG. 2C
FIG. 2D
FIG. 2E

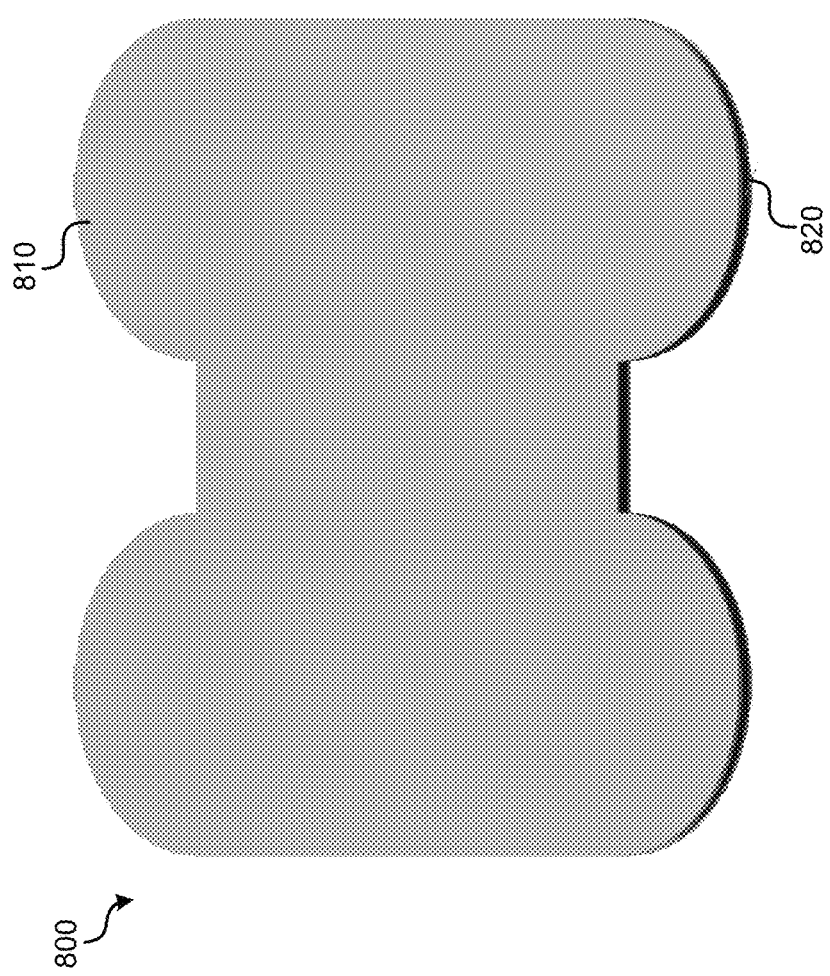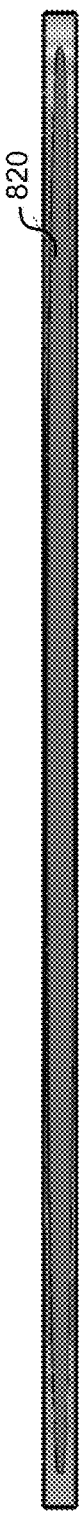
FIG. 8A
FIG. 8B

SOLDER PREFORM WITH INTERNAL FLUX CORE INCLUDING THERMOCHROMIC INDICATOR

CROSS-REFERENCE TO RELATED APPLICATIONS

This application claims priority to U.S. Provisional Application No. 62/840,931 filed Apr. 30, 2019 and titled "SOLDER TUBE WITH INTERNAL FLUX CORE INCLUDING THERMOCHROMIC INDICATOR," which is incorporated herein by reference in its entirety.

TECHNICAL FIELD

The present disclosure generally relates to solder preforms.

DESCRIPTION OF THE RELATED ART

Solder tubes may be utilized for a variety of soldering applications, including radio systems, wire harnesses, as an EMI shield to ground termination, wire to wire splicing, etc. For example, soldering tubes may be used for terminating electrical joints within a heat shrink termination device. The ends of exposed electrical wiring may be placed within the solder tube and soldered together. The solder tube alloy preform may provide a precise, controlled amount of solder to hold the wires securely in place while an outer plastic sleeve may provide enclosed protection from the elements and further electrical contact.

Solder tubes may be created using a progressive stamping die. For example, five to eight press strokes/cycles may be needed before a single tube is produced. Some conventional implementations of solder tubes provide a flux coating on the exterior of the solder tube to facilitate the soldering process. After the solder tube is made, it may be de-greased and then subjected to an exterior flux coating process. The exterior flux coating may be applied in the range of 0.5% to 3.0% by weight.

To provide a visual verification that a reflow temperature for the solder has been reached, a thermochromic dye may be added to the exterior flux coating. During reflow soldering that melts the flux, when a correct reflow temperature is reached, the thermochromic dye will change color (e.g., become colorless). The color change of the thermochromic dye will show the operator that the solder alloy of the solder tube has reached a correct temperature to melt the solder alloy such that an acceptable solder joint may be formed. FIG. 1 illustrates one such example of a thermochromic dye in a flux coating on a solder tube that is red prior to the reflow process/soldering.

SUMMARY

Implementations of the disclosure are directed to solder preforms with an internal flux core including a thermochromic indicator.

In one embodiment, a solder preform, comprises: a solder alloy body, the solder alloy body comprising at least one opening; and a flux core embedded in the solder alloy body, the flux core comprising a thermochromic indicator, wherein during reflow soldering, the flux core comprising the thermochromic indicator is configured to flow out of the at least one opening of the solder alloy. During reflow soldering, the thermochromic indicator may be configured to lose color as the solder alloy approaches its peak reflow soldering temperature.

In some implementations, the solder preform is in the shape of a solder tube and the solder alloy body is a cylindrically shaped solder alloy body comprising a first end; and a second end circumferentially overlapping the first end, wherein the at least one opening is located at the first end or the second end. In particular implementations, the at least one opening comprises a first opening and a second opening, the first opening located at the first end, and the second opening located at the second end, such that during reflow soldering, the flux core comprising the thermochromic indicator flows out of the first opening and the second opening. In some implementations, the second end is secured to the first end using an interlocking joint.

In some implementations, each of the first opening and the second opening are cut along an entire height of the solder tube, wherein during reflow soldering, flux core flowing out of the first opening of the first end coats an inside of the solder tube and flux core flowing of the second opening of the second end coats an outside of the solder tube. In some implementations, the second end is secured to the first end using an interference fit with one or more stakes.

In some implementations, the flux core of the solder tube comprises between 0.5 wt. % and 4.5 wt. % of the solder tube. In some implementations, the flux core of the solder tube comprises greater than 3.0 wt. % of the solder tube. In some implementations, the solder alloy comprises greater than or equal to 95.5 wt. % of the solder tube.

In particular implementations, the solder tube has a height ranging from 1.0 mm to 12.25 mm, an inner diameter ranging from 0.762 mm to 24.5 mm, and an outer diameter ranging from 1.27 mm to 25.96 mm, and wherein the second end overlaps the first end a distance ranging from 1.25 mm to 2.03 mm. In some implementations, the solder tube has a height to wall thickness of greater than 3:1.

In some implementations, the solder preform is in the shape of a solder washer with a central hole, wherein the solder alloy body comprises an inner diameter sidewall and an outer diameter sidewall, wherein the at least one opening is located at the inner diameter sidewall or the outer diameter sidewall. In some implementations, the at least one opening comprises a first opening and a second opening, the first opening located at the inner diameter sidewall, and the second opening located at the outer diameter sidewall, such that during reflow soldering, the flux core comprising the thermochromic indicator flows out of the first opening and the second opening.

In some implementations, the solder preform is in the shape of a solder disc, wherein the at least one opening is located at a sidewall along an outer diameter of the solder disc.

In some implementations, the solder preform is a segment of a solder ribbon, wherein the at least one opening is located at an end of the solder ribbon segment.

In some implementations, the solder alloy body is irregularly shaped.

In one embodiment, a solder ribbon comprises: a flat solder alloy body; and a flux core embedded in the solder alloy body, the flux core comprising a thermochromic indicator, wherein during reflow soldering, the thermochromic indicator is configured to lose color as the solder alloy heats approaches its peak reflow soldering temperature.

In one embodiment, a solder wire comprises: a wire-shaped solder alloy body; and a flux core embedded in the wire-shaped solder alloy body, the flux core comprising a thermochromic indicator, wherein during reflow soldering, the thermochromic indicator is configured to lose color as the solder alloy heats up above room temperature and approaches a peak reflow soldering temperature.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 2A shows a perspective view of a solder tube, in accordance with implementations of the disclosure.

FIG. 2B shows a side view of the solder tube of FIG. 2A.

FIG. 2C shows a cross-sectional top view of the solder tube of FIG. 2A.

FIG. 2D shows the top section of FIG. 2C.

FIG. 2E shows the bottom section of FIG. 2C.

FIG. 8A shows an irregularly shaped solder preform, in accordance with implementations of the disclosure.

FIG. 8B shows a cross-sectional view of the solder preform of FIG. 8A.

Figure 1:
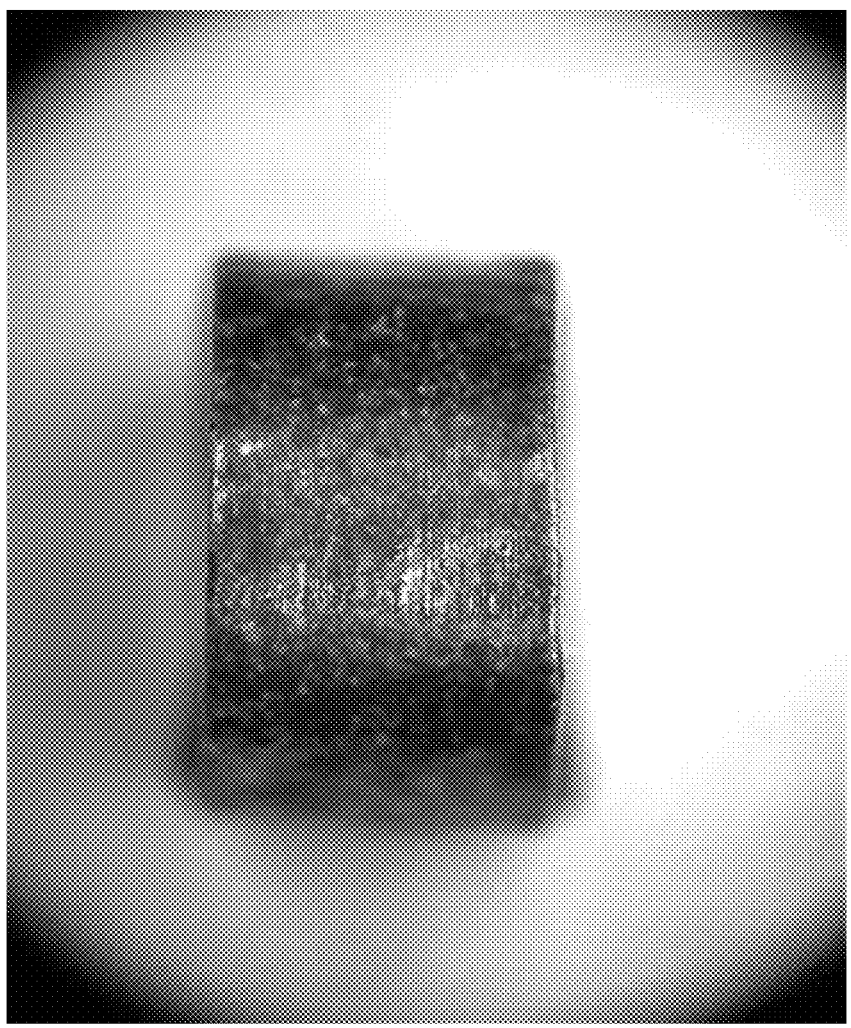
FIG. 1 shows an example of a thermochromic dye in a flux coating on a solder tube prior to reflow soldering.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As used herein, the term "thermochromic indicator" refers to a thermochromic dye, thermochromic pigment, or other thermochromic component that may provide a visual indication of when a soldering temperature has been reached. For example, the thermochromic indicator may be a visible color at room temperature. As the thermochromic indicator is heated at or above the alloy reflow temperature, the visible color may dissipate until the thermochromic indicator is colorless.

As noted above, solder tubes coated with a solder flux including a thermochromic dye may facilitate the soldering process by providing a visual indication of when correct soldering temperatures have been reached. This design, however, may have a number of problems.

First, if the amount of required flux is greater than about 2.0 wt %, it may become increasingly difficult to both obtain the required amount of flux by wt. % and uniformly coat the solder tube on its inner section and outer section.

Second, during manufacture it may be very difficult to achieve a consistent inner diameter (ID) dimension across solder tubes because of the amount of flux that gets into the center of the tube. In some instances, the center of the tube may become plugged with flux.

Third, the post flux curing step may present a variety of potential defects. The flux-coated surface of the tube may become tacky. Tubes may stick together and clump into one mass. The flux coating may chip off easily, leaving exposed areas. Because solder tubes may be handled several times after flux coating and before final packaging, there is the potential for damages occurring on multiple occasions. Further, if solder tubes rub against each other during shipment, the flux coating may turn into a flux powder/dust.

Fourth, because of the dust that may be created from shipping the solder tubes and how they may be bowl fed, they may cause increased downtime of production lines because of the cleaning of the bowls needed due to the build-up of flux powder.

In view of the foregoing issues, there is a need for an improved solder tube design. To this end, implementations of the disclosure are directed to solder tubes with an internal flux core including a thermochromic indicator. Additional implementations of the disclosure are directed to other solder preforms with an internal flux core including a thermochromic indicator.

FIGS. 2A-2E illustrate a solder tube 100 in accordance with implementations of the disclosure. FIG. 2A shows a perspective view of solder tube 100, FIG. 2B shows a side view of solder tube 100, and FIG. 2C shows a cross sectional top view of solder tube 100. FIGS. 2D and 2E show the top and bottom sections of FIG. 2C, respectively. As depicted, solder tube 100 has a cylindrically shaped solder alloy body, including an overlap joint with an outer end 110 circumferentially overlapping an inner end 120. In implementations, the body may have a circular cross section or an elliptical cross section. During formation, the solder tube 100 may be cut off at each of the ends 110 and 120 (e.g., heightwise along the solder tube). This allows an internal flux core 130 with a thermochromic indicator to flow out of the solder tube 100 through outer end 110 and inner end 120 during reflow soldering. In other implementations, only one of the ends 110 or 120 is cut such that the flux core 130 flows through only one of the ends.

In some implementations, the solder tube 100 may be perforated in one or more locations (e.g., either at the ends or some other location of the tube) to allow flux to flow out through the one or more perforations in addition to the ends during reflow soldering. The perforations may be of a suitable size and shape such that sufficient flux flows out of the perforations at a sufficient rate. The perforations may be formed after the solder alloy has been formed into a tube, or beforehand. In some implementations the solder alloy tube may be manufactured such that the flux only weeps out through perforations. For example, in such implementations, the solder tube may not have any overlapping ends (i.e., it is formed as a closed cylinder).

Each perforation may extend through the entire wall of the solder tube such that flux flows out of both an inner and outer side of the tube. Alternatively, the perforation may be formed such that flux only flows out through one of the inner side or outer side of the tube. The perforations may be suitably shaped (e.g., as an ellipse or polygon), deep, positioned, and/or numbered such that flux sufficiently covers the inner and/or outer surface of the tube and substrate during reflow soldering. For example, perforations may be circumferentially distributed throughout the solder tube (e.g., on the outer and/or inner side).

Although in some implementations the solder tube could be manufactured such that the flux only weeps out through perforations (e.g., without having any overlapping ends), it has been observed in some instances that perforations by themselves may not be sufficient for allowing the flux to weep out onto the substrate. Without being bound to any particular theory, this may be attributed to the softness of the solder alloy metals, which may have a tendency to smear over the perforations, thus not allowing the flux to escape to the extent of design depicted in FIGS. 2A-2E.

Referring again to FIGS. 2A-2E, flux core 130 flowing out of inner end 120 may flow onto the soldered substrate through the interior of the tube whereas flux core flowing out of outer end 110 may flow onto the soldered substrate through the exterior of the tube. During a reflow soldering process, the flux core 130 with the thermochromic indicator (e.g., dye or pigment) may weep out onto the substrate uniformly from cut ends 110 and 120. As the solder tube 100 is heated and the flux begins to melt, the flux may uniformly flow out of ends 110 and 120 to spread on the metal (e.g., wires) to be soldered, coating it with the thermochromic indicator color, cleaning the metal surface, and keeping the metal surface clean until the molten solder alloy reaches it, and promoting the spreading of the solder on the surface of the metal. By virtue of the illustrated implementations, improved wetting of the solder to the substrate may be achieved as compared to the conventional non-overlapping, flux-coated solder tube design. This in turn may facilitate the formation of a better solder joint. In experiments, the embedded flux was observed to spread better as compared to the conventional design.

Figure 3:
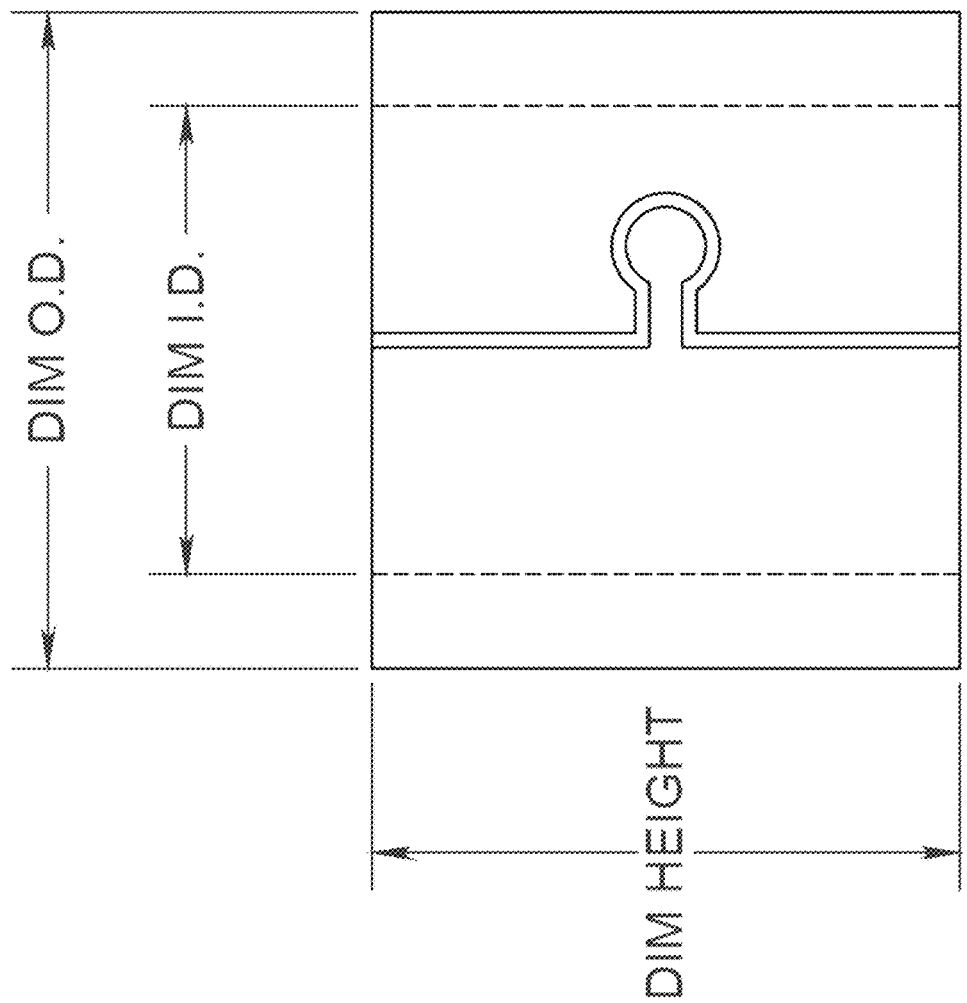
FIG. 3 shows an example design for interlocking an outer end with an inner end of a solder tube, in accordance with implementations of the disclosure.

In the illustrated example, the overlapped joint is formed by staking in two locations 140 (e.g., through the center of the overlapping joint to be formed) to form an interference fit to prevent joint separation of the two cut ends 110 and 120. It should be appreciated that in other implementations the overlapped joint may be staked in one location or more than two locations to prevent joint separation. For example, the number of stakes may vary depending on the height of the solder tube 100. Additionally, other methods may implemented as an alternative to or in addition to staking to prevent separation of or otherwise hold the overlapped joint in place. For example, in some implementations the overlapped joint may be created by spot soldering. As another example, FIG. 3 illustrates one example design for interlocking an outer end 110 with an inner end 120. The interlocked mechanical joint may have two separate cut off ends, allowing the flux core 130 to weep out and spread onto the substrates that are to be solder together. Although FIG. 3 depicts a "puzzle piece" interlock mechanism, other interlock mechanisms could be implemented.

In implementations, the flux core 130 may comprise between about 0.5 wt. % and 4.5 wt. % of the solder tube 100. The flux of flux core 130 may be a "no-clean" flux whose flux residue after reflow, may not need to be cleaned from the substrate to ensure reliability. Alternatively the flux may be a water soluble flux or some other type of flux.

Flux core 130 includes a thermochromic indicator that may be added to the flux prior to formation of solder tube 100. For example, a thermochromic dye or pigment may be added to a flux before it is processed into the center of the solder alloy, and then formed into solder tube 100. Depending on its chemical makeup, the thermochromic indicator may come in a variety of different colors. For example, the dye or pigment may be red, orange, pink, etc. The thermochromic indicator may be any suitable thermochromic component that, when heated, provides a visual indication that the solder alloy of solder tube 100 has reached a correct soldering temperature. During reflow soldering, the color of the thermochromic indicator coating the substrate may vanish at a desired reflow soldering temperature based on the chemistry of the thermochromic indicator component. When color is found to be non-existent during reflow (e.g., melting) of the alloy, this may provide an indication that the solder alloy has maintained a suitable temperature for a sufficient amount of time. As should be appreciated, the thermochromic indicator and color may be selected depending on the melting properties (e.g., solidus and/or liquidus temperatures) of the solder alloy.

The solder tube 100 may be comprised of any suitable solder alloy such as a tin-silver-copper (SAC) alloy, a Sn alloy, a SnAg alloy, a Bi alloy, an In alloy, or some other solder alloy. In some implementations, the solder tube 100 may be comprised of a single metal. The solder alloy or metal may make up 95.5 wt. % or greater of the solder tube. The solder tube may have a height to wall thickness ratio of greater than 3:1.

In implementations, the solder tube may have an inner diameter (ID) ranging from 0.762 mm to 24.5 mm and an outer diameter (OD) ranging from 1.27 mm to 25.96 mm, where the ID And OD measurements are taken perpendicular to the center of the overlap joint, from side to side as depicted in FIG. 2B. In implementations, the solder tube may have a height H ranging from 1.0 mm to 12.25 mm. In implementations, the solder tube overlap joint may have a distance D ranging from 1.25 mm to 2.03 mm.

The illustrated solder tube 100 may be used in a variety of applications, including cable splicing in wire harnesses and cable assemblies. For example, it may be placed within a plastic tube, wires may be inserted within tube 100, and then the assembly may be reflowed such that the solder creates an electrical connection while the plastic protects the connection from environmental hazards.

Figure 4:
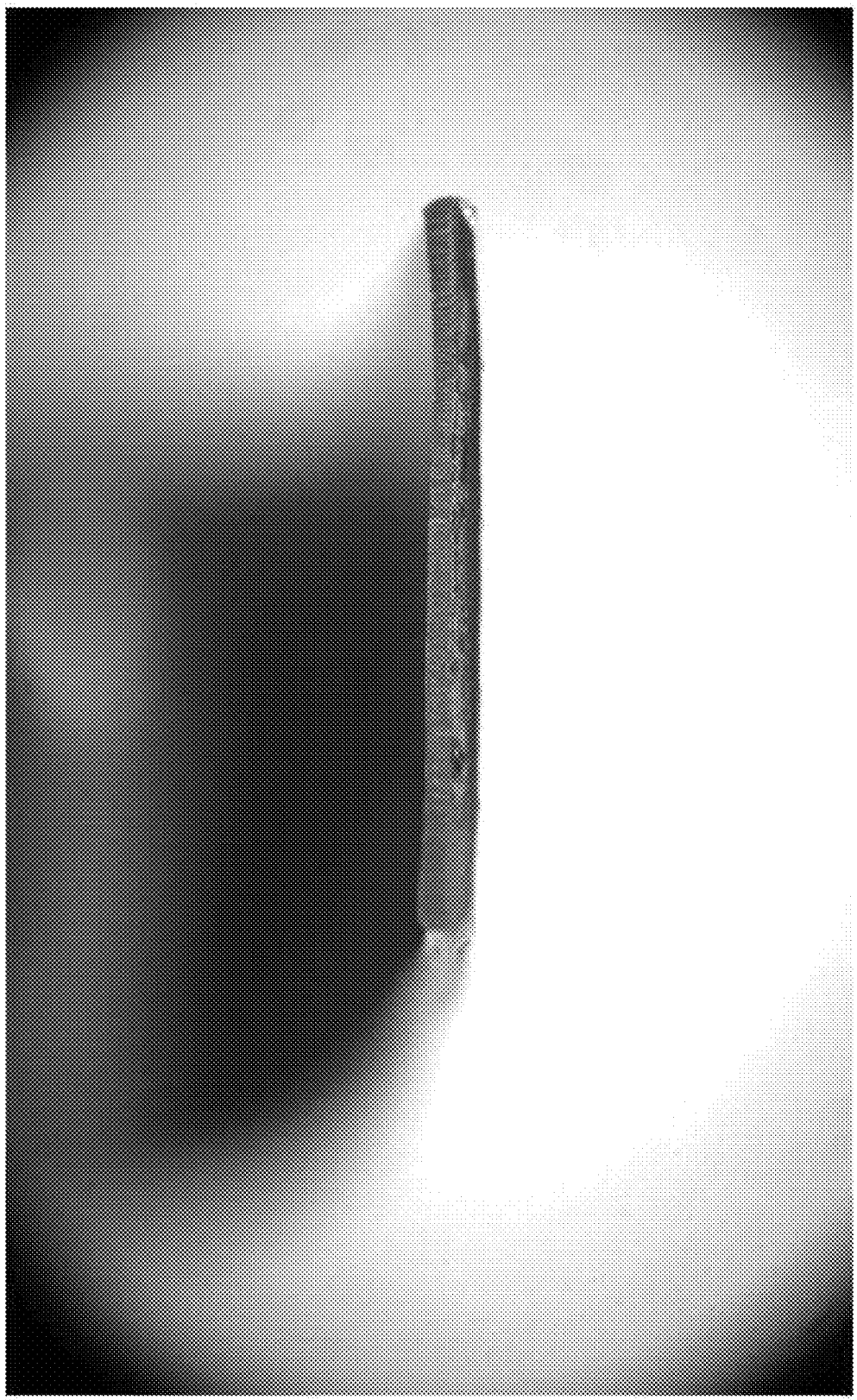
FIG. 4 shows a photograph illustrating a cross-section of a solder tube after being cut apart, in accordance with implementations of the disclosure.

FIG. 4 is a photograph illustrating a cross section of a solder tube after being cut apart, in accordance with implementations of the disclosure. As illustrated, a flux core with a thermochromic indicator is embedded in the solder alloy and distributed substantially and uniformly. The thermochromic indicator in this example is colored red.

A variety of advantages may be achieved from the internal flux core solder tube design described herein. First, the internal flux may have a higher level of flux by wt. % (e.g., up to about 4.5 wt. %, or in some cases even greater than 4.5 wt. %) as compared to the conventional exterior flux-coated design. Second, because the flux is contained within the walls of the tube, the ID and OD dimensions of the tube may have tighter tolerances, along with eliminating the problem of flux obstructing the inner portion of the tube. Third, as no post flux curing step is needed, this may eliminate the aforementioned issues of having a tacky flux-coated surface, parts sticking together, the flux coating chipping off, and the coated flux turning into dust/powder from parts rubbing together during shipment. Moreover, by removing the dust/powder problem, production lines may no longer need to stop to clean bowls having a build-up of flux powder, thereby allowing them to operate for longer periods of time. These and other advantages that may be realized from the solder tube design described herein will be appreciated from the disclosure.

While implementations of the disclosure have thus far been described in the context of solder tubes having an internal flux core including a thermochromic indicator, the techniques described herein could also be applied to a variety of other solder preforms that would benefit from having an embedded flux core with thermochromic indicator that flows out of the solder preform in a controlled manner to provide a visual indication during reflow soldering. By foregoing an external coating of flux with thermochromic indicator on other preforms shapes, chipping off of the external flux coating may be avoided. Additionally, the dust that may be created from shipping and handling such a product may be avoided.

The flux coating may chip off easily, leaving exposed areas. Because solder tubes may be handled several times after flux coating and before final packaging, there is the potential for damages occurring on multiple occasions. Further, if solder tubes rub against each other during shipment, the flux coating may turn into a flux powder/dust.

Figures 5A, 5B:
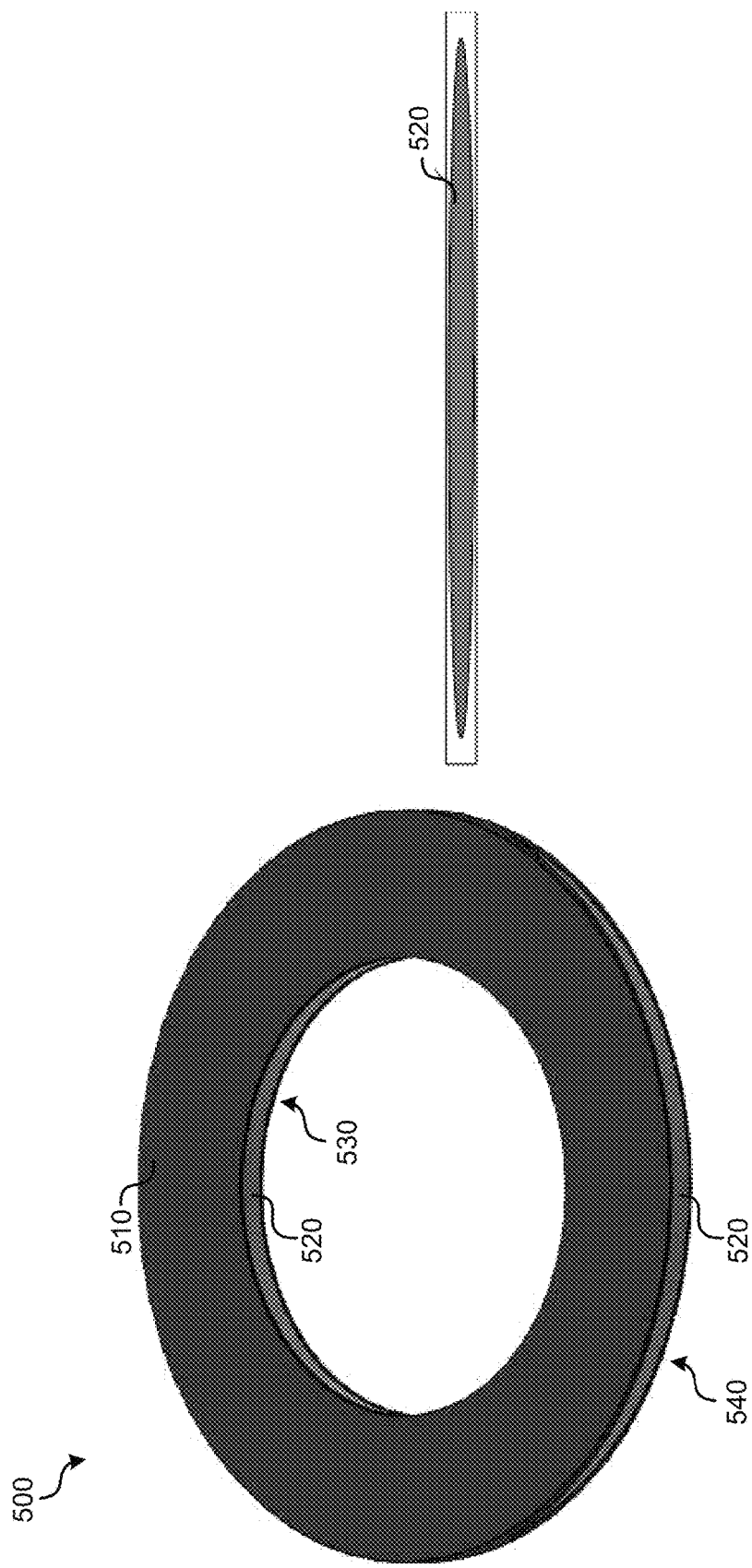
FIG. 5A shows a solder washer, in accordance with implementations of the disclosure.
FIG. 5B shows a cross-sectional view of the solder washer of FIG. 5A.

Fourth, because of the dust that may be created from shipping the solder tubes and how they may be bowl fed, For example, FIGS. 5A-5B illustrate a solder washer 500 in accordance with implementations of the disclosure. FIG. 5A shows a perspective view of solder washer 500. FIG. 5B shows a cross-sectional view of solder washer 500. As depicted, solder washer 500 has a flat, circularly shaped alloy body, with a central hole, an ID section 530, and an OD section 540. In some implementations, solder washer 500 may have a height to wall thickness ratio of less than or equal to three (e.g., a height to wall thickness ratio of 3:1). Although solder washer 500 has a circular body shape with a central circular hole in this example, in other implementations its body and/or central hole may have some other elliptical shape or a non-elliptical shape. For example, the washer hole and/or body may have a rectangular shape.

Embedded in solder alloy body 510 is an internal flux core 520 with a thermochromic indicator. In this example, the solder alloy body 510 is open along the sidewall(s) of ID section 530 and the sidewall(s) of OD section 540. As such, the internal flux core 520 flows out of solder washer 500 via the walls of ID section 530 and OD section 540 during reflow soldering. In other implementations, the side wall(s) of only one of the ID section 530 or OD section 540 is/are open.

In some implementations, solder washer 500 may have a thickness of between 0.1 mm and 3.937 mm; an ID between 0.381 mm and 12.7 mm; and an OD between 0.762 mm and 19.05 mm. Solder washer 500 may be manufactured using a stamping die. In some implementations, solder washer 500 may be stamped or cut from a solder. For example, a preform with internal flux core 520 may be formed, and the washer 500 may be cut or stamped from the preform. This process of cutting out the washer may expose the internal flux core 520 via the side walls of ID section 530 and OD section 540.

For example, a solder ribbon with internal flux core 520 may be formed, and the solder washer 500 may be stamped from the solder ribbon.

In other implementations, a solder washer having an overlapping joint similar to solder tube 100 may be formed in a similar manner to how solder tube 100 is formed.

Figures 6A, 6B:
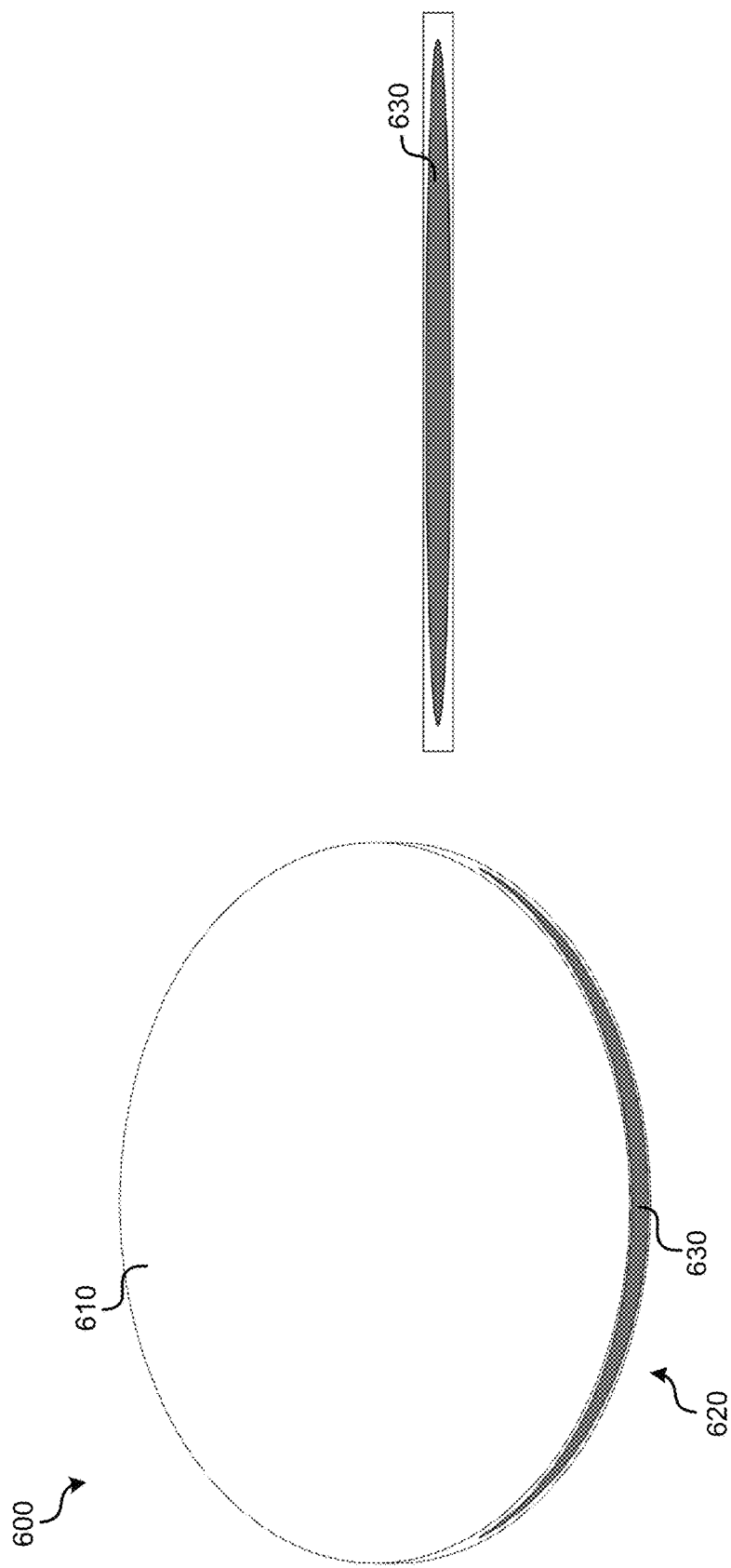
FIG. 6A shows a solder disc, in accordance with implementations of the disclosure.
FIG. 6B shows a cross-sectional view of the solder disc of FIG. 6A.

FIGS. 6A-6B illustrate a solder disc 600 in accordance with implementations of the disclosure. FIG. 6A shows a perspective view of solder disc 600. FIG. 6B shows a cross-sectional view of solder disc 600. As depicted, solder disc 600 has a flat, circularly shaped alloy body 610 and outer section 620. In some implementations, solder disc 600 may have a height to wall thickness ratio of less than or equal to three (e.g., a height to wall thickness ratio of 3:1). Although solder disc 600 has a circular body shape in this example, in other implementations its body may have some other elliptical shape.

Embedded in solder alloy body 610 is an internal flux core 630 with a thermochromic indicator. In this example, the solder alloy body 610 is open along the sidewall(s) of outer section 620. As such, the internal flux core 630 flows out of solder disc 600 via the sidewall(s) of outer section 620 during reflow soldering. In some implementations, the side wall(s) of solder disc 600 may be open along its entire diameter. In other implementations, the side wall(s) of solder disc may be open along a portion or portions of the disc's diameter.

In some implementations, solder disc 600 may have a thickness between 0.1 mm and 3.937 mm, and an OD between 0.762 mm and 19.05 mm. Solder disc 600 may be manufactured using a stamping die. In some implementations, solder disc 600 may be stamped or cut from a solder. For example, a preform with internal flux core 630 may be formed, and the solder disc 600 may be cut or stamped from the preform. This process of cutting out the disc may expose the internal flux core 630 via the side walls of outer section 620. For example, a solder ribbon with internal flux core 630 may be formed, and the solder disc 600 may be stamped from the solder ribbon.

Figures 7A, 7B:
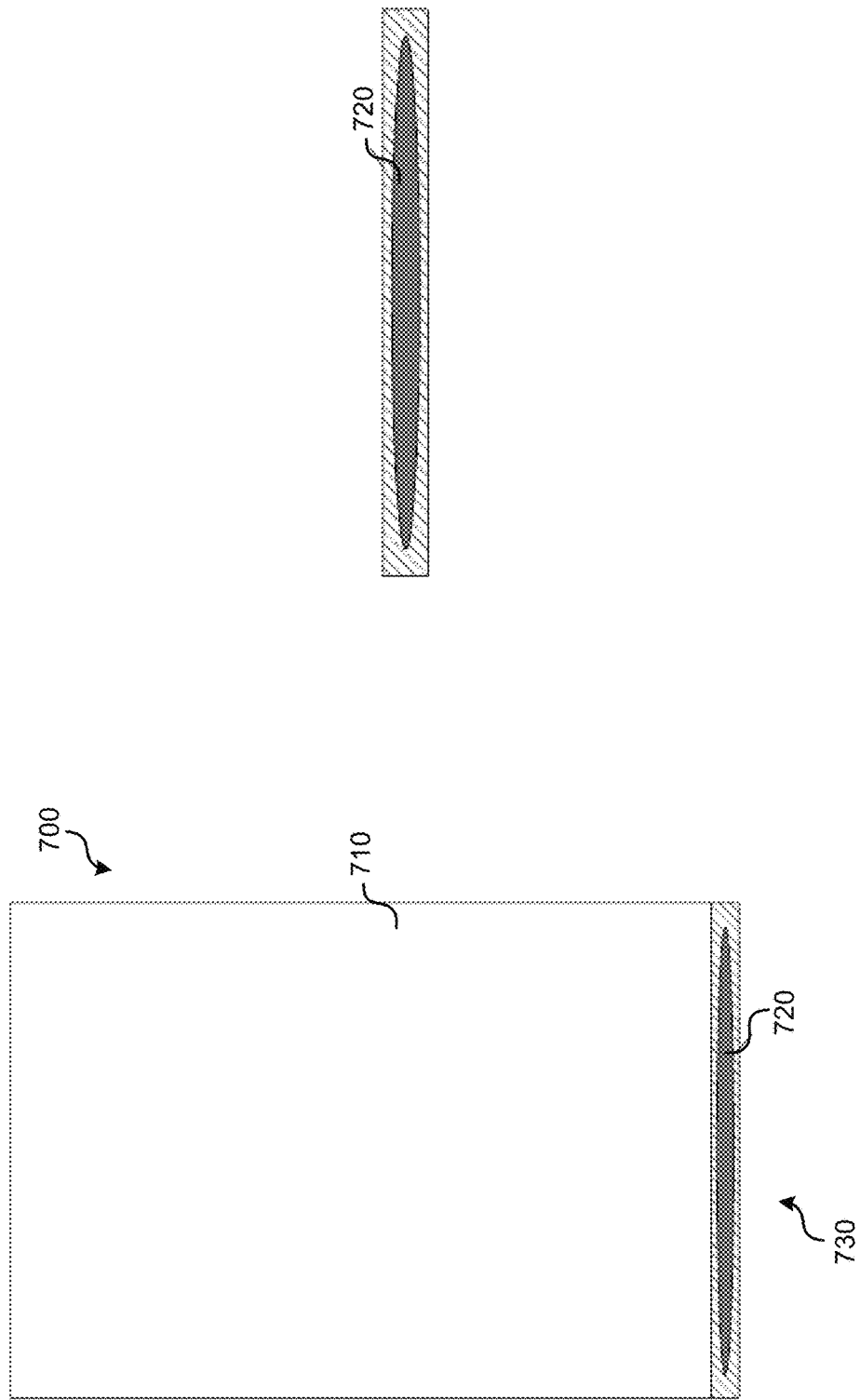
FIG. 7A shows a solder ribbon segment, in accordance with implementations of the disclosure.
FIG. 7B shows a cross-sectional view of the solder ribbon segment of FIG. 7A.

In some implementations, a solder preform formed by cutting a segment of solder ribbon may be used. FIGS. 7A-7B illustrate a solder ribbon segment 700 in accordance with implementations of the disclosure. FIG. 7A shows a top perspective view of solder ribbon segment 700. FIG. 7B shows a cross-sectional view of the solder ribbon segment 700. As depicted, solder ribbon segment 700 has a solder alloy body 710 that is flat and rectangular in shape. In some implementations, solder ribbon segment 700 may have a square shape.

Embedded in solder alloy body 710 is an internal flux core 720 with a thermochromic indicator. In this example, the solder alloy body 710 is open along an end 730 along its height. As such, the internal flux core 720 flows out of solder ribbon segment 700 via end 730 during reflow soldering. In implementations, the opening at end 730 may be formed by cutting solder ribbon segment 700 from a solder ribbon. For example, solder ribbon segment 700 may be cut from a spool of solder ribbon. In some implementations, solder ribbon segment 700 may be open along both ends such that the internal flux core 720 flows out of both ends during reflow soldering. In some implementations, solder ribbon segment 700 may have a thickness between 0.1 mm and 3.937 mm.

In some implementations, the solder preform described herein may be assume an irregular shape to tailor it to a specific application. FIGS. 8A-8B illustrate an irregularly-shaped solder preform 800 in accordance with implementations of the disclosure. FIG. 8A shows a top perspective view of solder preform 800. FIG. 8B shows a cross-sectional view of the solder preform 800. As depicted, solder preform 800 has an irregularly-shaped, flat solder alloy body 810. Embedded in solder alloy body 810 is an internal flux core 820 with a thermochromic indicator. During reflow soldering, the internal flux core 820 flows out of an opening of the solder preform 800.

In some implementations, the solder preform may be in the shape of a rectangular prism or other shape. For example, it may have a flat shaped solder alloy body, that has two sets of sides that are parallel to each other, where both sets of side may or may not be of the same length. In such instances, the internal flux core with thermochromic indicator may flow out the sides of the preform.

In some implementations, a solder wire having an embedded flux core with a thermochromic indicator may be utilized. The solder wire may have an elliptical (e.g., circular) or polygonal (e.g., square) cross-section. In some implementations, the solder wire may have a diameter between 0.1 mm to 19.05 mm. During use, the solder wire may be cut to expose the internal flux core (e.g., at one end or both ends), which flows out during reflow soldering. For example, a segment of solder wire may be cut from a spool.

In some implementations, the solder preforms, ribbons, or wires described herein may be perforated in one or more locations of the solder alloy body to allow flux to flow out through the one or more perforations in addition to the other open sections during reflow soldering. For example, during reflow soldering using solder washer 500, the flux could flow out of the perforations in addition to the sidewall(s) of ID section 530 and/or OD section 540. As another example, during reflow soldering using solder disc 600, the flux could flow out of the perforations in addition to the sidewall(s) of OD section 630. The perforations may be of a suitable size and shape such that sufficient flux flows out of the perforations at a sufficient rate. The perforations may be formed after the solder alloy has been formed into a solder preform shape (e.g., washer, disc, ribbon segment), or beforehand. In alternative implementations, the solder preforms described herein may be manufactured such that the flux only weeps out through perforations.

In some implementations, the flux core with thermochromic indicator of the solder preforms, ribbons, or wires described herein may comprise between about 0.5 wt. % and 4.5 wt. % of the solder preform. In some implementations, the flux core may comprise between about 3.0 wt. % and 4.5 wt. % of the solder preform. In other implementations, the flux core may comprise greater than 4.5 wt. % of the solder preform, ribbon, or wire. The flux core may be a "no-clean" flux whose flux residue after reflow, may not need to be cleaned from the substrate to ensure reliability. Alternatively the flux may be a water soluble flux or some other type of flux.

In some implementations, the solder alloy body of the solder preforms, ribbons, or wire described herein may comprise any suitable solder alloy such as a tin-silver-copper (SAC) alloy, a Sn alloy, a SnAg alloy, a Bi alloy, an In alloy, or some other solder alloy. In some implementations, the solder alloy body may be comprised of a single metal. The solder alloy body may make up 95.5 wt. % or greater of the solder preform, ribbon, or wire.

In some implementations, the solder preforms, ribbons, or wire described herein may be configured to melt at a temperature between about 115° C. and 370° C. The color of the thermochromic indicator of the flux core may be configured to vanish at a temperature between about 120° C. and 375° C. The thermochromic indicator may be configured to become colorless once a peak reflow soldering temperature is reached. The peak reflow soldering temperature may be between about 115° C. and 370° C.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A solder preform in the shape of a solder tube or solder washer, the solder preform comprising:
    a cylindrically shaped solder alloy body comprising an inner surface, an outer surface, a first end, a second end, a first opening located at the first end, and a second opening located at the second end, the second end circumferentially overlapping the first end, and the first opening and the second opening cut along an entire height of the solder alloy body; and
    a flux core embedded in the solder alloy body between the inner surface and the outer surface, the flux core comprising a thermochromic indicator, wherein during reflow soldering, the flux core comprising the thermochromic indicator is configured to flow out of the first opening of the first end to coat the inner surface of the solder alloy body and to flow out of the second opening of the second end to coat the outer surface of the solder alloy body.

2. The solder preform of claim 1, wherein the second end is secured to the first end using an interference fit with one or more stakes.

3. The solder preform of claim 1, wherein the flux core comprises between 0.5 wt. % and 4.5 wt. % of the solder preform.

4. The solder preform of claim 2, wherein the flux core comprises greater than 3.0 wt. % of the solder preform.

5. The solder preform of claim 3, wherein the solder alloy body comprises greater than or equal to 95.5 wt. % of the solder preform.

6. The solder preform of claim 1, wherein the solder alloy body has a height ranging from 1.0 mm to 12.25 mm, an inner diameter ranging from 0.762 mm to 24.5 mm, and an outer diameter ranging from 1.27 mm to 25.96 mm, and wherein the second end overlaps the first end a distance ranging from 1.25 mm to 2.03 mm.

7. The solder preform of claim 1, wherein the solder alloy body has a height to wall thickness of greater than 3:1.

8. The solder preform of claim 7, wherein during reflow soldering, the thermochromic indicator is configured to lose color as the solder alloy approaches its peak reflow soldering temperature.

9. The solder preform of claim 1, wherein the second end is secured to the first end using an interlocking joint.

10. The solder preform of claim 1, wherein during reflow soldering, the thermochromic indicator is configured to lose color as the solder alloy approaches its peak reflow soldering temperature.

11. The solder preform of claim 1, wherein the solder preform is in the shape of the solder washer.

12. The solder preform of claim 1, wherein the second end interlocks with the first end.

13. The solder preform of claim 1, wherein the flux core comprises between about 3.0 wt. % and 4.5 wt % of the solder preform.

14. The solder preform of claim 1, wherein the flux core comprises greater than 4.5 wt % of the solder preform.

* * * * *